United States Patent
Feng et al.

(10) Patent No.: US 11,217,386 B2
(45) Date of Patent: Jan. 4, 2022

(54) TRANSFORMERS, POWER CONVERTERS HAVING TRANFORMERS, AND METHODS OF CONVERTING ELECTRICAL POWER

(71) Applicant: Hamilton Sundstrand Corporation, Charlotte, NC (US)

(72) Inventors: Frank Z. Feng, Loves Park, IL (US); John Duward Sagona, Poplar Grove, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 81 days.

(21) Appl. No.: 16/671,961

(22) Filed: Nov. 1, 2019

(65) Prior Publication Data
US 2021/0134523 A1 May 6, 2021

(51) Int. Cl.
| | |
|---|---|
| H01F 27/38 | (2006.01) |
| H01F 30/16 | (2006.01) |
| H02M 3/335 | (2006.01) |
| H02M 5/12 | (2006.01) |

(52) U.S. Cl.
CPC ............ *H01F 27/38* (2013.01); *H01F 30/16* (2013.01); *H02M 3/33576* (2013.01); *H02M 5/12* (2013.01)

(58) Field of Classification Search
CPC ........ H01F 27/00; H01F 27/006; H01F 27/34; H01F 27/38; H01F 30/16; H02M 1/44; H02M 3/33576; H02M 5/10; H02M 5/12; H02M 5/18
See application file for complete search history.

(56) References Cited

U.S. PATENT DOCUMENTS

| | | | | |
|---|---|---|---|---|
| RE33,345 E | * | 9/1990 | Sylvester, Jr. | ...... H01F 27/2823 336/180 |
| 5,122,947 A | * | 6/1992 | Hishiki | ................. H01F 27/346 363/61 |
| 5,847,518 A | | 12/1998 | Ishiwaki | |
| 7,123,123 B2 | | 10/2006 | Isurin et al. | |
| 7,616,088 B1 | | 11/2009 | Baker et al. | |
| 8,749,054 B2 | * | 6/2014 | de Rochemont | ... H01L 29/4238 257/724 |
| 10,044,293 B2 | | 8/2018 | Kamata | |
| 2003/0080847 A1 | | 5/2003 | Radzelovage | |
| 2010/0033993 A1 | * | 2/2010 | Kim | ........................ H01F 27/38 363/17 |

(Continued)

FOREIGN PATENT DOCUMENTS

WO    2009008740 A1    1/2009

OTHER PUBLICATIONS

European Search Report for Application No. 20204002.8, dated Mar. 26, 2021, 68 pages.

*Primary Examiner* — Matthew V Nguyen
(74) *Attorney, Agent, or Firm* — Cantor Colburn LLP (57) ABSTRACT

A transformer includes a core with a surface, a primary winding with two or more primary winding turns wrapped about the core, and a secondary winding with one and only one secondary winding turn extending about the core. The one and only one secondary winding turn is interleaved among the two or more primary winding turns on the surface of the core to limit magnetic flux leakage along the primary winding and the secondary winding. Power converters and power conversion methods are also described.

16 Claims, 6 Drawing Sheets

(56) References Cited

U.S. PATENT DOCUMENTS

2017/0154726 A1* 6/2017 Prager ............... H01F 30/16
2017/0278618 A1  9/2017 Matsui et al.
2018/0034372 A1* 2/2018 Jacobson ............ H01F 27/36
2020/0153354 A1* 5/2020 Ozeri ................. H01F 29/14

* cited by examiner

TRANSFORMERS, POWER CONVERTERS HAVING TRANFORMERS, AND METHODS OF CONVERTING ELECTRICAL POWER

BACKGROUND

The present disclosure is generally related to electrical systems, and more particularly to power conversion in electrical systems.

Transformers, such as in vehicular electrical systems, are commonly used to convert alternating current (AC) power input to a primary winding into AC power output by a secondary winding. At the primary winding the input AC power generates a magnetic field that oscillates according to frequency of the input AC power. The oscillating magnetic field drives magnetic flux through a magnetic circuit coupling the primary winding to the secondary winding, generally through a core formed from a ferromagnetic material having suitable magnetic permeability and coupling the secondary winding to the primary winding. The magnetic flux generates a magnetic field at the secondary winding, the magnetic field inducing output AC power at the secondary winding corresponding to both the frequency of the input AC power and a ratio of primary winding turns to secondary winding turn.

As the magnetic flux is driven through the magnetic circuit some amount of the magnetic flux leaks from the magnetic circuit. The leakage flux typically induces eddy currents in the windings, which reduce the transformer efficiency according to the square of the transformer frequency and the amount of leakage flux in the vicinity of windings. While typically acceptable at low frequencies, efficiency losses associated with magnetic flux leakage in high frequency transformers can result in more significant efficiency losses, require that the core be oversized in relation to the magnetic flux communicated by the magnetic circuit, and dictate to that cooling be provided to maintain core permeability during operation.

Such systems and methods having generally been satisfactory for their intended purpose. However, there remains a need in the art for improved transformers, power converters, and power conversion methods

BRIEF DESCRIPTION

A transformer includes a core with a surface, a primary winding with two or more primary winding turns wrapped about the core, and a secondary winding with one and only one secondary winding turn extending about the core. The one and only one secondary winding turn is interleaved among the two or more primary winding turns on the surface of the core to limit magnetic flux leakage along the primary winding and the secondary winding.

In addition to one or more of the features described above, or as an alternative, further examples of the transformer may include that the secondary winding includes N legs of identical U-shaped wires connected electrically in parallel with one another, N being a turn ratio of the transformer.

In addition to one or more of the features described above, or as an alternative, further examples of the transformer may include that the transformer has a turn ratio of twenty (20) and that the one and only one secondary winding includes twenty U-shaped wires connected electrically in parallel with one another In addition to one or more of the features described above, or as an alternative, further examples of the transformer may include that the two or more secondary winding turn legs are connected electrically in parallel with one another.

In addition to one or more of the features described above, or as an alternative, further examples of the transformer may include that a number of the primary winding turns is equivalent to a number of the secondary winding turn legs.

In addition to one or more of the features described above, or as an alternative, further examples of the transformer may include that the primary winding turns are arranged in a single layer on the surface of the core.

In addition to one or more of the features described above, or as an alternative, further examples of the transformer may include that the two or more of primary winding turns are distributed uniformly in a single layer on the surface of the core and that the one and only one secondary winding turn is distributed uniformly about the surface of the core.

In addition to one or more of the features described above, or as an alternative, further examples of the transformer may include that the core has a toroid-shaped body.

In addition to one or more of the features described above, or as an alternative, further examples of the transformer may include that the core is formed from a nanocrystalline alloy.

In addition to one or more of the features described above, or as an alternative, further examples of the transformer may include a secondary winding turn start board with a start trace, the U-shaped portion of the secondary winding turn connected to the secondary winding start board and electrically connected to the start trace.

In addition to one or more of the features described above, or as an alternative, further examples of the transformer may include a primary alternating current (AC) flow traversing the primary winding turns in a first direction, and a secondary AC flow traversing the secondary winding turn in a second direction, wherein the second direction is opposite the first direction in each of a plurality of secondary winding turn legs spaced from one another by the primary winding turns.

A power converter is also provided. The power converter includes a rectifier, a transformer as described above and an inverter. The secondary winding is electrically connected to the rectifier and the inverter is electrically connected to the primary winding of the transformer.

In addition to one or more of the features described above, or as an alternative, further examples of the power converter may include that the primary winding turns are arranged in a single layer on the surface of the core, the one and one secondary winding turn is arranged in a single layer on the surface of the core, and that the one and only one secondary winding turn is distributed about the surface of the core.

In addition to one or more of the features described above, or as an alternative, further examples of the power converter may include that the secondary winding has one and not more than one secondary winding turn and that the core has a toroid-shaped body.

A power conversion method is additionally provided. The method includes, at a transformer as described above, receiving a primary AC flow at the primary winding, inducing a secondary AC flow in the secondary winding, and limiting magnetic flux leakage from one of the primary AC flow and the secondary AC flow with the other of the primary AC flow and the secondary AC flow.

In addition to one or more of the features described above, or as an alternative, further examples of the power conversion method include that the one and only one secondary winding turn has two or more secondary winding turn legs paralleling the primary winding turns, the method further including flowing the primary AC flow in a first direction through each of the primary winding turn of the primary winding, and flowing the secondary AC flow in a second direction through each of a plurality of secondary winding turn legs, the second direction opposite the first direction.

In addition to one or more of the features described above, or as an alternative, further examples of the power conversion method include cancelling magnetic flux leakage from the primary AC flow in the primary winding turns with the secondary AC flow through the secondary winding turn.

Technical effects of the present disclosure include transformers that having a secondary winding turn interleaved among the turns of the primary winding. In certain examples the primary winding turns secondary winding turn extend about the core such that current flow through the secondary winding turn opposes current flow through the primary winding turn, limiting (or eliminating entirely) leakage flux along paralleling paths of the primary winding turns and the secondary winding turn. In accordance with certain examples transformers described herein can be relative efficient, e.g., exhibiting relatively low power losses, and/or can be relatively lightweight for a given power rating. For example, in accordance with certain examples, transformers constructed in accordance with the present disclosure can exhibit a winding total power loss of 26% less than transformers not employing an interleaved secondary winding turn for a given power rating.

BRIEF DESCRIPTION OF THE DRAWINGS

The following descriptions should not be considered limiting in any way. With reference to the accompanying drawings, like elements are numbered alike.

DETAILED DESCRIPTION

Figure 1:
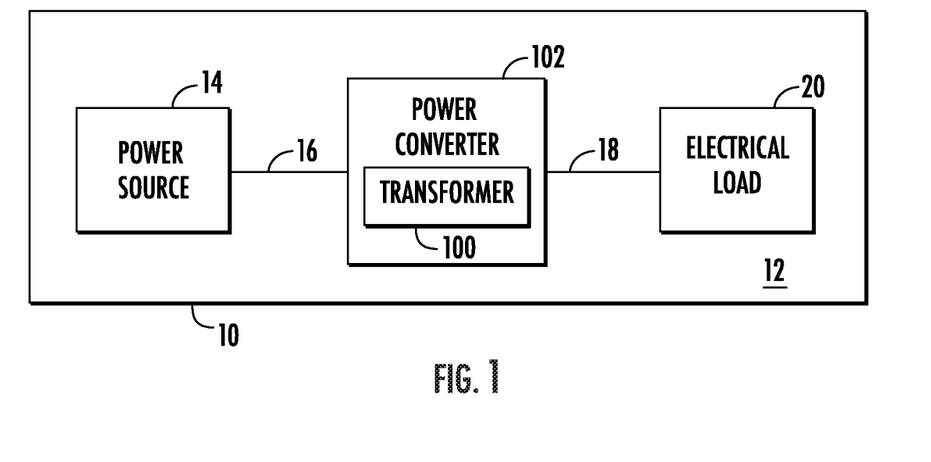
FIG. 1 is schematic view of a vehicle carrying an electrical system, schematically showing a power source in electrical communication with an electrical through a power converter with a transformer.

Reference will now be made to the drawings wherein like reference numerals identify similar structural features or aspects of the subject disclosure. For purposes of explanation and illustration, and not limitation, a partial view of an example of a transformer constructed in accordance with the disclosure is shown in FIG. 1 and is designated generally by reference character 100. Other embodiments of transformers, power converters, and power conversion methods in accordance with the present disclosure, or aspects thereof, are provided in FIGS. 2-7, as will be described. The systems and methods described herein can be used to transform alternating current (AC) power from one form to another, such as in high-voltage direct current (HVDC) electrical systems, though the present disclosure is not limited to HVDC electrical systems or to aircraft electrical systems in general.

Referring to FIG. 1, a vehicle 10, e.g., an aircraft, is shown. The vehicle 10 includes an electrical system 12 with a power source 14, a high-voltage lead 16, a power converter 102, a low-voltage lead 18, and an electrical load 20. The high-voltage lead 16 is electrically connected to the power source 14. The power converter 102 is electrically connected to the high-voltage lead 16. The low-voltage lead 18 is electrically connected to the power converter 102. The electrical load 20 is connected to the low-voltage lead 18, and therethrough to the power source 14 through the power converter 102 and the high-voltage lead 16.

The transformer 100 is arranged within the power converter 102, is electrically connected to the power converter 102, and electromagnetically couples the high-voltage lead 16 to the low-voltage lead 18. In certain examples the transformer 100 is arranged as an isolation transformer to provide electrical isolation between the high-voltage lead 16 and the low-voltage lead 18. In accordance with certain examples the power source 14 is DC power source and the electrical load 20 is a DC electrical load. It is also contemplated that, in accordance with certain examples, that the power source 14 can be a HVDC power source 14, e.g., a 540-volt DC power source, and the electrical load 20 can be a low-voltage electrical load, e.g., a 28-volt electrical load.

Figure 2:
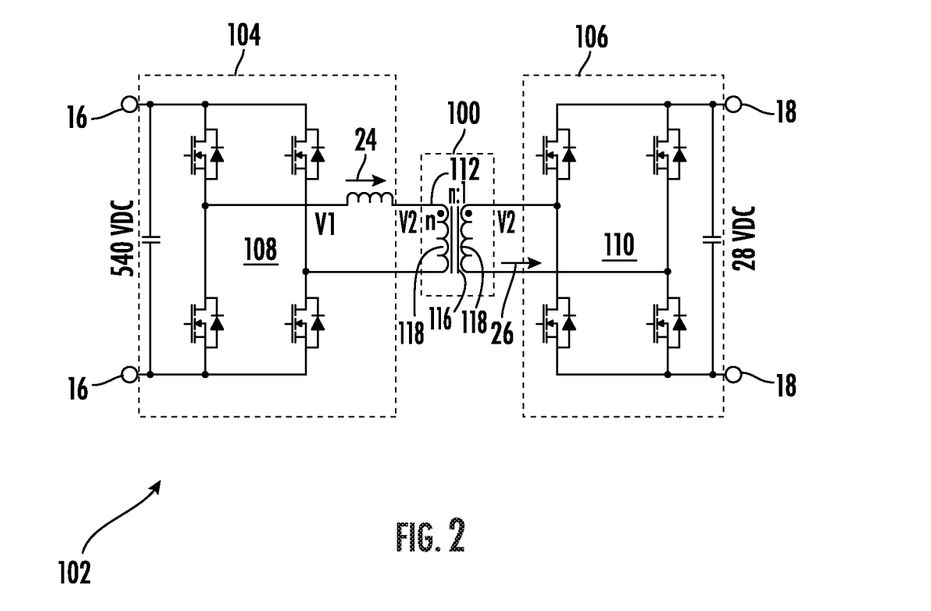
FIG. 2 is a circuit diagram of the power converter and the transformer of FIG. 1 according to an example, showing the transformer electromagnetically coupling an inverter to a rectifier.

With reference to FIG. 2, the power converter 102. The power converter 102 includes the transformer 100, an inverter 104, and a rectifier 106. The inverter 104 has an inverter switch array 108 and is electrically connected to the high-voltage lead 16. The inverter switch array 108 is arranged to convert HVDC power received from the high-voltage lead 16 into a primary AC flow 24.

The rectifier 106 has a rectifier switch array 110 and is electrically connected to the low-voltage lead 18. The rectifier switch array 110 is arranged to convert a secondary AC flow 26 received from the transformer 100 into low-voltage DC power, which the rectifier 106 applies to the low-voltage lead 18. In certain examples the inverter 104 is arranged to convert 540-volt HVDC power into the primary AC flow 24. In accordance with certain examples the rectifier 106 is arranged to convert the secondary AC flow 26 into a 28-volt DC power.

The transformer 100 includes a primary winding 112, a secondary winding 114, and a core 116. The primary winding 112 is electrically connected to the inverter 104 and includes a plurality of primary winding turns 118. The plurality of primary winding turns 118 extend about the core 116 to route the primary AC flow 24 about the core 116. The secondary winding 114 is electrically connected to the rectifier 106 and includes one and only one secondary winding turn 120. The one and only one secondary winding turn 120 extends about the core 116 such that magnetic flux 34 communicated to the one and only one secondary winding turn 120 induces the secondary AC flow 26 in the secondary winding 114. The core 116 electromagnetically couples the primary winding 112 to the secondary winding 114 to define a magnetic circuit for communicating the magnetic flux 34 to the secondary winding 114 from the primary winding 112.

In some transformers magnetic flux can leak from the transformer core. Such leakage flux can generate eddy current in the transformer windings, reducing efficiency of the transformer by the square of the transformer frequency and the magnitude of the leakage flux, and generating heat. While the efficiency loss and heating associated with magnetic flux leakage is typically small in low-frequency transformers, e.g., transformers operating at frequencies below about 400 hertz, the efficiency loss and heating in high-frequency transformers, e.g., transformers operating at frequencies greater than 10 kilohertz, can require that the core be oversized in relation to the magnetic flux communicated by the core and/or that the transformer be cooled during operation. To limit (or eliminate entirely) efficiency loss and heating due to magnetic flux leakage the one and only one secondary winding turn 120 is interleaved among the plurality of primary winding turns 118 of the primary winding 112, as will be described.

Figure 3:
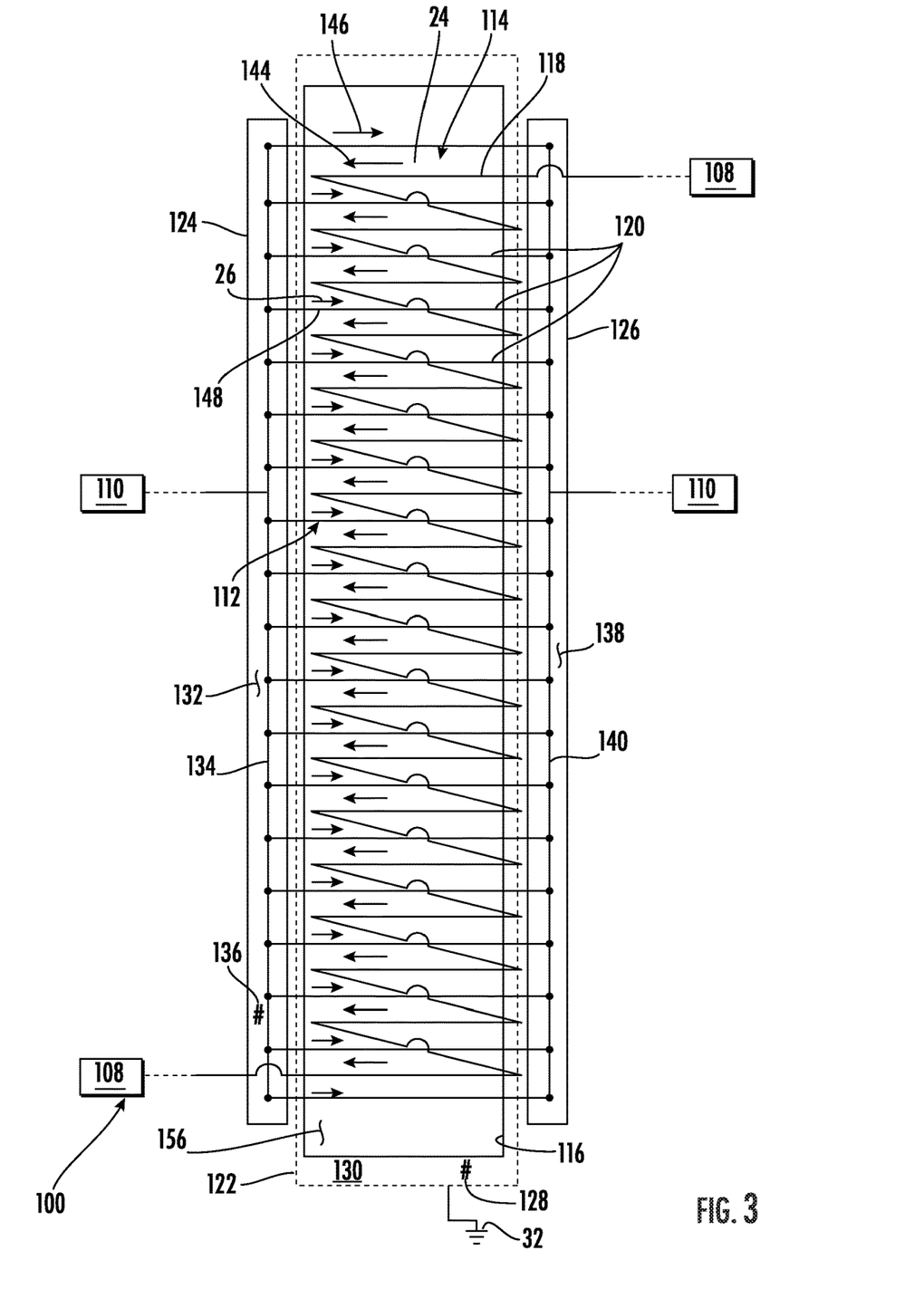
FIG. 3 is a circuit diagram of the transformer of FIG. 1 according to an example, showing a single secondary winding turn with a plurality of legs connected electrically in parallel and interleaved among twenty (20) primary winding turns.

With reference to FIG. 3, the transformer 100 is shown. The transformer 100 includes the primary winding 112, the secondary winding 114, and the core 116. The transformer 100 also includes a housing 122, a secondary winding turn start board 124, and a secondary winding turn finish board 126.

The housing 122 is formed from a metallic material 128 and has an interior 130. The housing 122 is electrically connected to a ground terminal 32. The core 116, the primary winding 112, and the secondary winding 114 are each arranged within the interior 130 of the housing 122.

The secondary winding turn start board 124 is offset from the housing 122 and includes a printed circuit board (PCB) body 132 and a start trace 134. The PCB body 132 is formed from an electrically insulative material 136. The start trace 134 is arranged within the PCB body 132 and is therein electrically insulated by the PCB body 132. The secondary winding 114 (shown in FIG. 2) is connected to the secondary winding turn start board 124, and therethrough with the one and only one secondary winding turn 120.

The secondary winding turn finish board 126 is offset from the housing 122 and includes a printed circuit board (PCB) body 138 and a finish trace 140. The finish trace 140 is arranged within the PCB body 138. The PCB body 138 is formed from an electrically insulative material, e.g., the electrically insulative material 136 which provides electrical isolation to the finish trace 140. The secondary winding 114 is connected to the secondary winding turn finish board 126 such that the one and only one secondary winding turn 120 is electrically connected to the finish trace 140.

The core 116 is formed from a material having high magnetic permeability. In certain examples the core 116 is formed from ferrite. In accordance with certain examples the core 116 is formed from a nanocrystalline alloy. It is contemplated that the core 116 can include toroid-shaped body 142 (shown in FIG. 5). It is also contemplated that, in accordance with certain examples, the core 116 can include a U-shaped body or an E-shaped body.

The primary winding 112 extends into the interior 130 of the housing 122 to connect the inverter 104 (shown in FIG. 2) to the primary winding turns 118. The primary winding turns 118 are each wrapped about the core 116 to flow the primary AC flow 24 through each of the primary winding turns 118. In this respect each of the primary winding turns 118 are electrically connected in series with one another, the primary AC flow 24 thereby flowing in a first direction 144 through the primary winding turns 118.

The secondary winding 114 includes the one and only one secondary winding turn 120. The one and only one secondary winding turn 120 extends about the core 116, is electromagnetically coupled to the primary winding turns 118 by the core 116 such that the primary AC flow 24 induces the secondary AC flow 26 therein and has a plurality of secondary winding turn legs 146, e.g., wires, interleaved among to the primary winding turns 118. The plurality of secondary winding turn legs 146 are electrically connected in parallel with one another through both the start trace 134 of the secondary winding turn start board 124 and the secondary winding turn finish board 126, respectively. This causes the secondary AC flow 26 to flow flowing between the start trace 134 and the finish trace 140 through the plurality of secondary winding turn legs 146 in a second direction 148. In certain examples the secondary winding 114 includes N secondary winding turn legs 146, e.g., identical U-shaped wires, connected electrically in parallel with one another, N being a turn ratio of the transformer 100.

It is contemplated that the second direction 148 be opposite the first direction 144. In this respect the secondary AC flow 26 opposes the primary AC flow 24 at locations adjacent the core 116 where the secondary winding turn legs 146 extends in a parallel to the primary winding turns 118. The opposing directions limit (or eliminates entirely) leakage flux on the surface 156 of the core 116 in the vicinity of the plurality of primary winding turns 118 and the one and only one secondary winding turn 120 by locally canceling the magnetic field responsible for the leakage flux.

Figure 4:
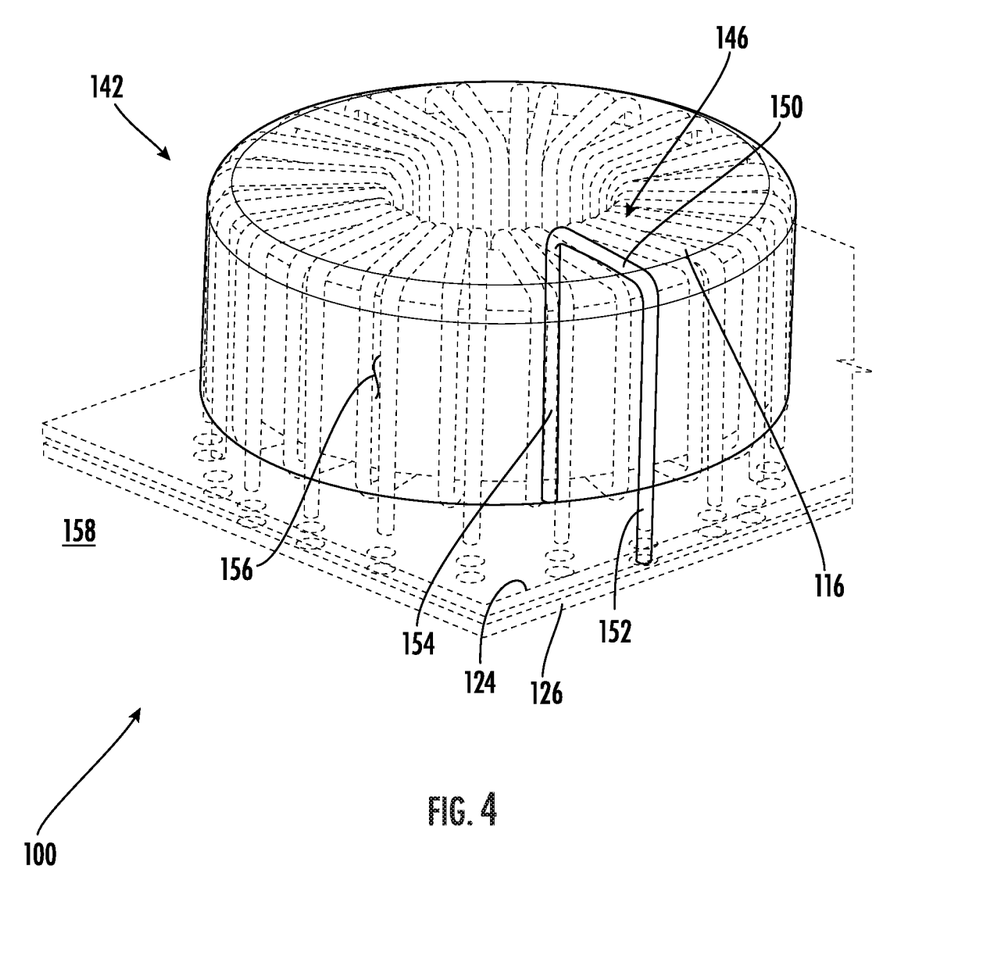
FIG. 4 is a perspective view of the transformer of FIG. 1 according to the example, showing a housing containing a core with a toroid-shaped body and a secondary winding start board arranged between the housing and a secondary winding finish board.

With reference to FIGS. 4, the transformer 100 is shown according to an example. As shown in FIG. 4, the secondary winding turn leg 146 includes a U-shaped portion 150, a start trace interconnect portion 152, and a finish trace interconnect portion 154. The U-shaped portion 150 extends about the core 116, e.g., conforms to a surface 156 of the core 116. In the illustrated example core 116 defines toroid-shaped body 142, the U-shaped portion 150 conforming to the profile of the toroid-shaped body 142.

The start trace interconnect portion 152 extends from the U-shaped portion 150, is connected to the secondary winding turn start board 124, and electrically connects the U-shaped portion 150 to the start trace 134 (shown in FIG. 3). The finish trace interconnect portion 154 extends from a side of the U-shaped portion 150 opposite the start trace interconnect portion 152, is connected to the secondary winding turn finish board 126, and electrically connects the U-shaped portion 150 to the finish trace 140 (shown in FIG. 3). In the illustrated example the secondary winding turn start board 124 and the secondary winding turn finish board 126 are arranged on a common side 158 of the core 116, which increases distance along which the secondary winding turn leg 146 parallels the adjacent secondary winding turn leg 146 interleaved with the respective primary winding turn 118.

Figure 5:
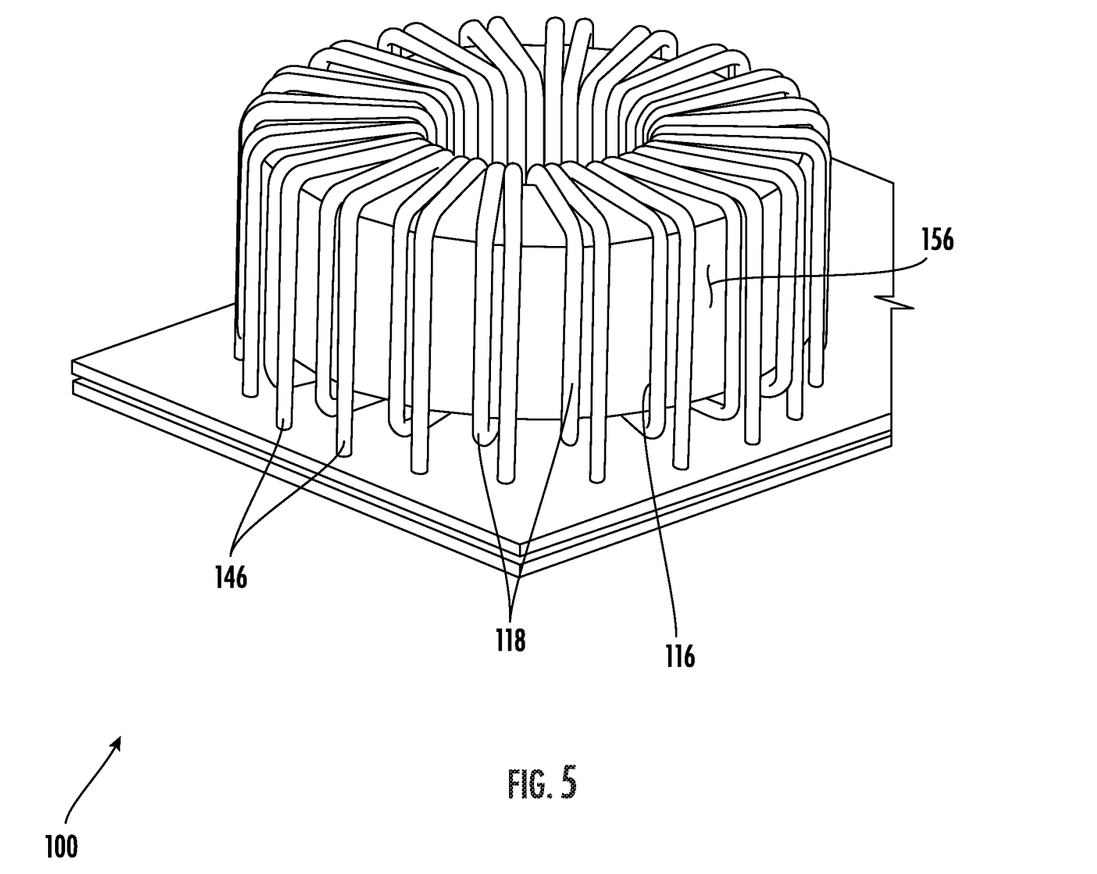
FIG. 5 is a perspective view of the transformer of FIG. 1 according to the example with the housing removed, showing a primary AC flow and a secondary AC flow communicated in opposite directions through the interleaved secondary winding turn and primary winding turns.

As shown in FIG. 5, the one and only one secondary winding turn 120 includes a number of secondary winding turn legs 146 that is equivalent of a number of primary winding turns 118. In the illustrated example the one and only one secondary winding turn 120 has twenty (20) secondary winding turn legs 146, and the primary winding 112 includes twenty (20) primary winding turns 118. Matching the number of secondary winding turn legs 146 of the one and only one secondary winding turn 120 provides leakage flux cancellation and a turns ratio equivalent to the number of secondary winding turn legs 146. While shown and described herein as having a turn ratio of twenty (20), suitable for isolation transformers employed in 540-volt HVDC to 28-volt DC power converters, transformers having smaller or larger turn ratios are also within the scope of the present disclosure.

Figure 6:
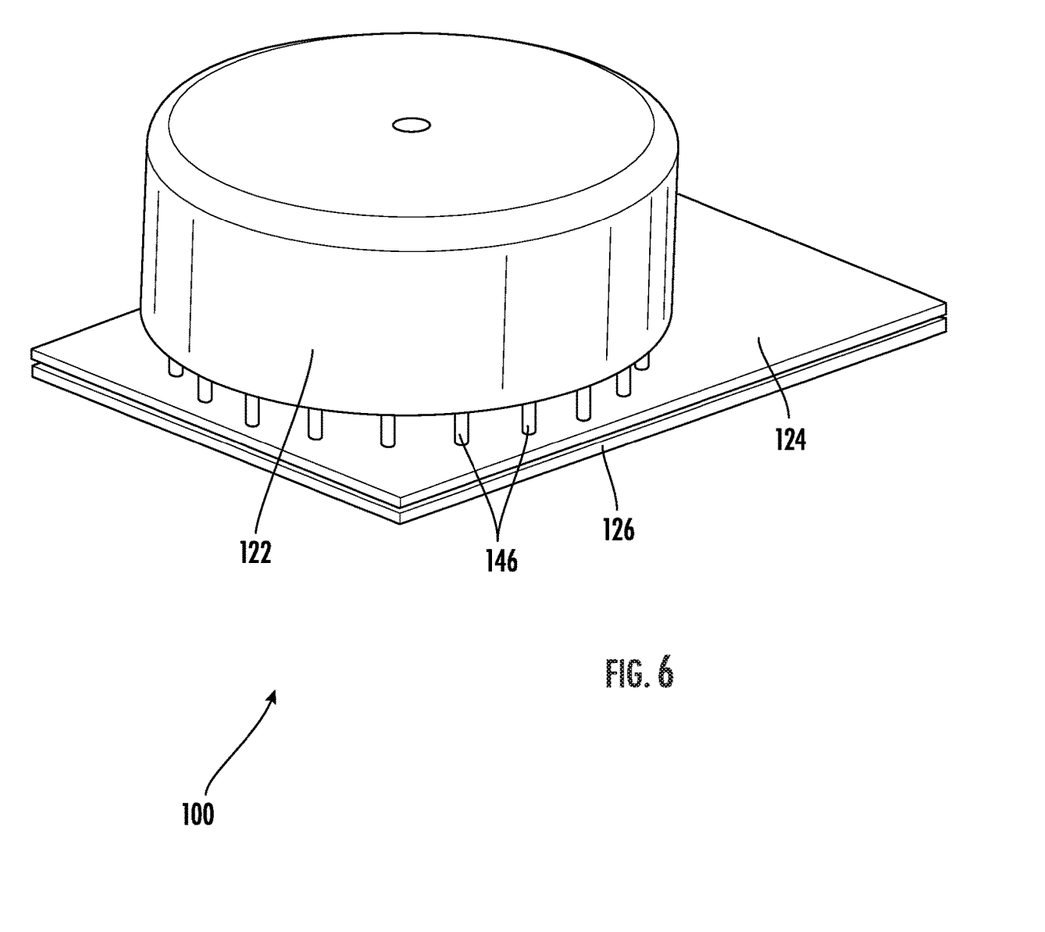
FIG. 6 is perspective and partially phantom view of the transformer of FIG. according to the example with the housing removed, showing a secondary winding turn having a U-shaped portion and extending about the core; and\

In the illustrated example the plurality of primary winding turns 118 and the secondary winding 114 abut the core 116. More specifically, the plurality of primary winding turns 118 of the primary winding 112 are arranged in a single layer on the surface 156 of the core 116 and are uniformly distributed thereabout such at each of the plurality of primary winding turns 118 are equally spaced from one another and each of the plurality of secondary winding turn legs 146. The plurality of secondary winding turn legs 146 are also arranged in a single layer on the surface 156 of the core 116 and are uniformly distributed thereabout such at each of the plurality of secondary winding turn legs 146 are equally spaced from one another and each of the plurality of primary winding turns 118. Arranging the plurality of primary winding turns 118 and the plurality of secondary winding turn legs 146 uniformly and in a single layer limits spacing between the core 116 and the primary winding 112 and the secondary winding 114, reducing resistance to magnetic flux communication between the core 116 and the primary winding 112 and the secondary winding 114, respectively. As shown in FIG. 6, arranging the primary winding 112 and the secondary winding 114 in a single layer also limits size of the transformer 100 by limiting spacing between the housing 122 and the core 116.

Figure 7:
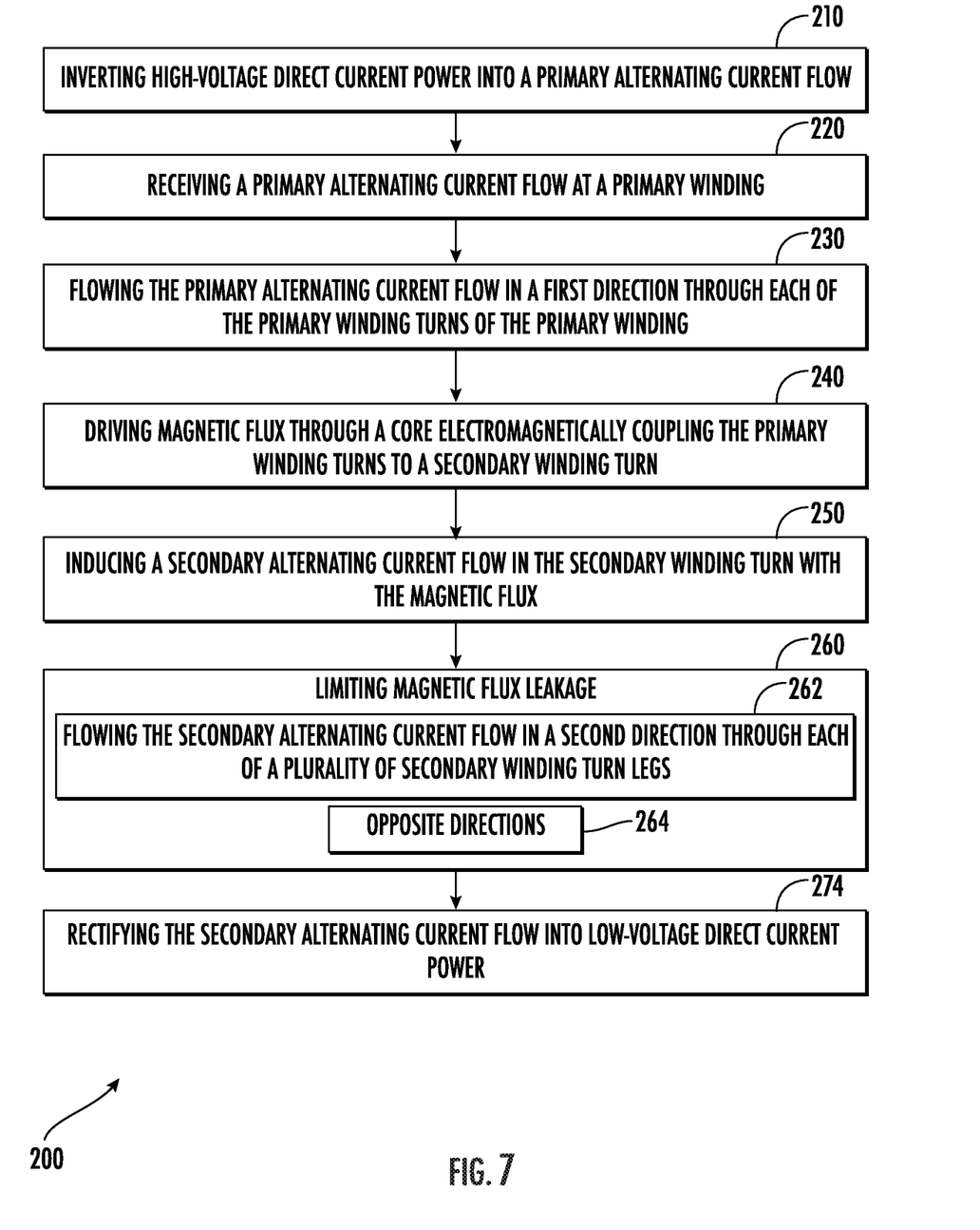
FIG. 7 is a block diagram of a power conversion method, showing steps of the method according to an illustrative and non-limiting example of the method.

With reference to FIG. 7, a power conversion method 200 is shown. The method 200 includes inverting DC power into a primary AC flow, e.g., the DC power from the power source 14 (shown in FIG. 1) into the primary AC flow 24 (shown in FIG. 2), as shown with box 210. In certain examples the DC power can be HVDC power, e.g., 540-volt HVDC power. The primary AC flow is received at a primary winding of a transformer, e.g., the primary winding 112 (shown in FIG. 2) of the transformer 100 (shown in FIG. 1), as shown with box 220. The primary winding flows the primary AC current in a first direction through each of the primary winding turns of the primary winding, e.g., in the first direction 144 (shown in FIG. 3) through the plurality of primary winding turns 118 (shown in FIG. 3), as shown with box 230.

As shown with box 240, the primary AC flow carried by the primary AC flow generates a primary winding magnetic field at a core coupling the primary winding to a secondary winding, e.g., the core 116 coupling the primary winding to the secondary winding 114 (shown in FIG. 2). The primary winding magnetic field drives magnetic flux through a magnetic circuit defined by the core, e.g., the magnetic flux 34 (shown in FIG. 2), as also shown by box 240, the magnetic flux in turn inducing a secondary AC flow at the secondary winding, e.g., the secondary AC flow 26 (shown in FIG. 3), as shown by box 250.

As shown by box 260, magnetic field leakage is limited along the primary winding turns and secondary winding turn. More specifically, as shown by box 262, the legs of the one and only one secondary winding turn flow the secondary AC flow in a second direction, e.g., the second direction 248 (shown in FIG. 3), through each of the legs of the secondary winding turn. This causes a magnetic field associated with the secondary AC flow through each of the legs of the one and only one secondary winding turn to oppose a magnetic field associated with the primary AC flow through the respective primary winding turns paralleling the secondary winding turn leg. It is contemplated that the secondary AC flow oppose the primary AC flow, as shown box 262. It is also contemplated that, in certain examples, that the secondary AC flow be parallel and oppose the primary AC flow, as shown in box 264. The secondary AC flow is thereafter rectified into a low-voltage DC flow, such as a 28-volt DC flow, as shown with box 274.

Transformers, such as in power converters employed in HVDC electrical systems, are commonly employed to convert AC power from one form to another form of AC power. Such transformers generally include a primary winding coupled to a secondary winding by a core. The core is formed from a ferromagnetic material of high magnetic permeability such that input AC power applied to the primary winding generates a magnetic field at the primary winding, the magnetic field drives magnetic flux through a magnetic circuit defined by the core and coupled to the secondary winding, and the magnetic flux in turn generates a magnetic field at the secondary winding. The magnetic field at the secondary winding induces current in the secondary winding, which is communicated by the transformer as the transformer output AC power.

As will be appreciated by those of skill in the art in view of the present disclosure, portions of the magnetic field may leak from the magnetic circuit defined by the core and in the vicinity of the transformer windings. The leakage flux induces eddy currents in the transformer windings, reducing transformer efficiency according to the square of the transformer frequency multiplied by the magnitude of the leakage flux and heating the transformer. While the associated efficiency decrease and heating are generally acceptable in low frequency transformers, e.g., transformers having frequencies of 400 hertz, the efficiency losses and heating can be large enough in high frequency transformers that the transformer core need be oversized relative the size otherwise required for magnetic flux communication and/or that the core be cooled during operation.

In examples described herein transformers include a secondary winding with one and only one secondary winding turn interleaved among turns of the primary winding. For example, the legs of the secondary winding turn can have a U-shape. Legs of the secondary winding turn can be electrically connected in parallel with one another. Further, each of the secondary winding legs can be singularly distributed between sets of primary winding turns electrically in series with one another, the number of secondary winding legs equaling the number of serially connected primary winding turns separating adjacent secondary winding legs. In this respect examples of the transformer can have twenty (20) secondary winding legs each separated from one another by twenty (20) primary winding turns connected electrically in series with one another, the transformer having a turns ratio of twenty (20) for converting 540-volt HVDC power into 28-volt DC power.

In certain examples the transformer is electrically connected within a power converter such that current flow through primary winding turns flows in a direction opposite current flow through the adjacent secondary winding turn to limit (of cancel entirely) leakage flux along parallel lengths of the primary winding turn and the secondary winding turn. In accordance with certain examples turns of the primary winding and legs of the secondary winding can be arranged in a single layer on the surface of the transformer core, limiting leakage. It is also contemplated that the transformer core can have a toroid-shaped body, which can be formed from a nanocrystalline alloy in certain examples.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A transformer, comprising:
a core with a surface;
a primary winding with a plurality of primary winding turns wrapped about the core;
a secondary winding with one and only one secondary winding turn extending about the core, wherein the one and only one secondary winding turn is interleaved among the plurality of primary winding turns on the surface of the core to limit magnetic flux leakage along the primary winding and the secondary winding;
a primary alternating current (AC) flow traversing the primary winding turns in a first direction; and
a secondary AC flow traversing the secondary winding turn in a second direction, wherein the second direction is opposite the first direction in each of a plurality of secondary winding turn legs spaced from one another by the primary winding turns.

2. The transformer of claim 1, wherein the secondary winding includes N legs of identical U-shaped wires connected electrically in parallel with one another, N being a turn ratio of the transformer.

3. The transformer of claim 1, wherein the transformer has a primary winding with N primary winding turns, N being a positive integer, wherein the secondary winding has N U-shaped conductors connected in parallel.

4. The transformer of claim 3, wherein the plurality of secondary winding turn legs are connected electrically in parallel with one another.

5. The transformer of claim 3, wherein a number of the primary winding turns is equivalent to a number of the secondary winding turn legs.

6. The transformer of claim 1, wherein the primary winding turns are arranged in a single layer on the surface of the core.

7. The transformer of claim 1, wherein the plurality of primary winding turns is distributed uniformly in a single layer on the surface of the core, wherein the secondary winding turn is distributed uniformly about the surface of the core.

8. The transformer of claim 1, wherein the core has a toroid-shaped body.

9. The transformer of claim 1, wherein the core is formed from a nanocrystalline alloy.

10. The transformer of the claim 9, further comprising a secondary winding turn start board with a start trace, wherein the U-shaped portion of the secondary winding turn is connected to the secondary winding start board and is electrically connected to the start trace.

11. The transformer of claim 9, further comprising a secondary winding finish board with a finish trace, wherein the U-shaped portion of the secondary winding turn is connected to the secondary winding finish board and is electrically connected to the finish trace.

12. A power converter, comprising:
a rectifier;
a transformer as recited in claim 1, wherein the secondary winding is electrically connected to the rectifier; and
an inverter electrically connected to the primary winding of the transformer.

13. The power converter of claim 12, wherein the primary winding turns are arranged in a single layer on the surface of the core, and wherein the secondary winding turn is arranged in a single layer on the surface of the core, wherein the secondary winding turn is distributed about the surface of the core.

14. The power converter of claim 12, wherein the secondary winding includes one and not more than one secondary winding turn, and wherein the core has a toroid-shaped body.

15. A power conversion method, comprising:
at a transformer including a core with a surface, a primary winding with a plurality of primary winding turns wrapped about the core, and a secondary winding with one and only one secondary winding turn extending about the core, the one or more secondary winding turn interleaved among the plurality of primary winding turns on the surface of the core,
receiving a primary alternating current (AC) flow at the primary winding;
inducing a secondary AC flow in the secondary winding; and
limiting magnetic flux leakage from one of the primary AC flow and the secondary AC flow with the other of the primary AC flow and the secondary AC flow:
wherein the one and only one secondary winding turn includes a plurality of secondary winding turn legs paralleling the primary winding turns, the method comprising:
flowing the primary AC flow in a first direction through each of the primary winding turn of the primary winding; and
flowing the secondary AC flow in a second direction through each of a plurality of secondary winding turn legs, the second direction opposite the first direction.

16. The method of claim 15, further comprising cancelling magnetic flux leakage from the primary AC flow in the primary winding turns with the secondary AC flow through the secondary winding turn.

* * * * *